United States Patent Office 3,046,094
Patented July 24, 1962

3,046,094
METHOD OF PREPARATION OF INORGANIC CHEMICAL COMPOUND
Glen E. Arth, Cranford, and John Fried, Plainfield, N.J., assignors to Merck & Co., Inc., Rahway, N.J., a corporation of New Jersey
No Drawing. Filed July 28, 1960, Ser. No. 45,794
3 Claims. (Cl. 23—205)

This invention relates to purification processes and more particularly to a method for removal of chlorinating agents from commercial-grade sulfur tetrafluoride.

Commercial-grade sulfur tetrafluoride may be prepared from sulfur, chlorine and sodium fluoride, by reacting these compounds at a temperature in the range of 200–300° C. and at a pressure of about 1000 p.s.i.g. in yields of about 80%. The reaction is as follows:

$$S + 2Cl_2 + 4NaF \rightarrow SF_4 + 4NaCl$$

The details of the preparation of $SF_4$ are in Tullock, Fawcets, Smith and Coffman, J.A.C.S., 82, February 5, 1960, pp. 539–542.

The main impurities resulting from this process are chlorine, thionyl fluoride ($SOF_2$), sulfur dichloride ($SCl_2$) and sulfur monochloride ($S_2Cl_2$). Both chlorine and thionyl fluoride present in the reaction mass can be removed by distillation, but the procedure has limitations.

Sulfur tetrafluoride prepared in this manner contains the following constituents:

(1) Sulfur tetrafluoride _____ 90–94% by weight.
(2) Thionyl fluoride _____ 5–9% by weight.
(3) Chlorine _____ 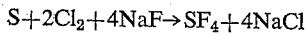
(4) Sulfur monochloride _____ } Approx. 1%.
(5) Sulfur dichloride _____

Sulfur tetrafluoride is used to react with ketones to form the gem difluorides. An example is the reaction of one mole of sulfur tetrafluoride with one mole of cyclohexanone, where one mole of 1,1-difluorohexane is formed. The reaction is as follows:

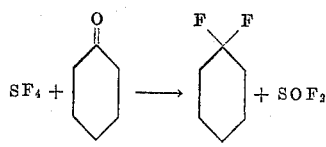

Several reactions for the formation of gem difluorides from ketones require the presence of a relatively large excess of sulfur tetrafluoride. When in a reaction where a large excess of sulfur tetrafluoride is required, sulfur tetrafluoride containing chlorine will cause a portion of the desired compound to be chlorinated as well as fluorinated. The reaction of chlorine with ketones is much more rapid than the reaction of sulfur tetrafluoride with ketones.

An example of a reaction where excess sulfur tetrafluoride is required is where 12 grams of sulfur tetrafluoride are needed to form 3,3-difluoro-androstane-17β-ol acetate from 500 mgs. of androstane-17β-ol-3-one acetate, wherein a large portion of the sulfur tetrafluoride is used as a solvent. The sulfur tetrafluoride, being commercial-grade, can contain as much as 1% by weight of chlorine. In other words, 12 grams of sulfur tetrafluoride contains .12 gram of chlorine which is equal to .0016 mole of chlorine. Now, 500 mgs. of androstane-17β-ol-3-one acetate represents .0015 mole of that steroid. Consequently, the probability is very high that .0015 mole of chlorinated steroid will be formed before any of the sulfur tetrafluoride will react with the steroid. Hence, the reaction mass will contain 2-chloro-3,3-difluoro-androstane-17β-ol acetate and not the desired 3,3-difluoro-androstane-17β-ol acetate.

Consequently, it is desired that the chlorination agents in the sulfur tetrafluoride be removed prior to the reaction with those compounds where a relatively large excess of sulfur tetrafluoride is required.

It is, therefore, an object of this invention to provide sulfur tetrafluoride in a form which will be free of chlorinating agents.

Another object of this invention is to provide a process which will economically remove chlorinating agents from commercial sulfur tetrafluoride.

Other objects of this invention will appear as the description proceeds.

We have now discovered that liquid mercury under certain conditions will remove chlorinating agents from sulfur tetrafluoride but will not react with the sulfur tetrafluoride or cause the sulfur tetrafluoride to react with other compounds, or cause the sulfur tetrafluoride to decompose.

In carrying out the process of the present invention, hereinafter described in the examples, the following procedure is utilized:

Mercury is placed in contact with sulfur tetrafluoride in an enclosed volume while the sulfur tetrafluoride is in a liquid state. The system is allowed to come to room temperature. The enclosed system is then agitated whereby the liquid mercury comes into intimate contact with the commercial sulfur tetrafluoride. The mercury thus reacts with the chlorinating agents in the sulfur tetrafluoride but does not react with the sulfur tetrafluoride itself. The compound thus formed is mercuric chloride, which is solid at room temperature. The pure sulfur tetrafluoride is then separated from the mercury and the mercuric chloride by distillation.

The sulfur tetrafluoride thus purified is suitable for fluorinating ketones to make gem difluorides without causing a chlorine atom to replace hydrogen on the alpha-carbon of the ketone.

The following examples are given for purposes of illustration and not by way of limitation:

*Example 1*

A bomb of carbon steel construction containing one pound of sulfur tetrafluoride (technical) having a volume of 500 cc., at a temperature of 26° C. and a pressure of 150 p.s.i.g. was immersed in a Dry Ice-acetone slurry for for a period of one hour. The temperature of the sulfur tetrafluoride (technical) was thereby reduced to −80° C.

$SF_4$ (technical) has the following composition:

(1) $SF_4$ _____ 90–94% (by weight).
(2) Thionyl fluoride _____ 5–9%.
(3) Chlorine _____
(4) Sulfur monochloride _____ } Approx. 1%.
(5) Sulfur dichloride _____

The pressure within the bomb was then very much lower than atmospheric. 100 grams of liquid mercury was then added to the bomb through an open valve. After this mercury was introduced into the bomb, the valve was closed. The bomb was then removed from the Dry Ice-acetone slurry and exposed to room temperature for about one hour. The bomb was then agitated by shaking for 16 hours in a Rocking Shaker (manufactured by the American Instrument Company) operating at 36 revolutions per minute. The valve on the bomb was then connected to the valve on a second bomb by a steel tube. The second steel bomb, having a volume of 500 cc., was evacuated and placed in a Dry Ice-acetone slurry.

The valves on the bombs were opened and the $SF_4$ in the original bomb distilled into the second bomb, leaving the liquid mercury in the first bomb. This distilled $SF_4$ contained no chlorinating agents.

*Example 2*

100 grams of mercury was added to a bomb of stainless steel construction having a volume of 500 cc. The bomb was evacuated and cooled to —80 °C. by immersing it in a Dry Ice-acetone slurry. One pound of liquid sulfur tetrafluoride (technical) was added to the bomb. The valve on the bomb was then closed, and the bomb was warmed to room temperature. It was then placed on a Rocking Shaker (as described in Example 1) and rocked at 36 revolutions per minute for 16 hours. The sulfur tetrafluoride contained in the bomb was then found to be free of chlorinating agents. The sulfur tetrafluoride may remain in the bomb in contact with the mercury, for the mercury will not amalgamate with stainless steel as it will with carbon steel.

*Example 3*

500 mg. of androstane-17β-ol-3-one acetate having the structure:

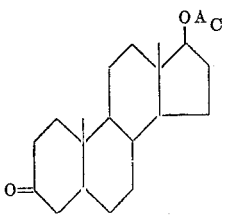

was placed in a stainless steel bomb having a volume of 20 cc. To this bomb 12 gm. of sulfur tetrafluoride (technical) and 0.05 ml. of boron trifluoride diethyl ether $(BF_3) \cdot (C_2H_5)_2O$ was added. The bomb was closed and heated at a temperature of 80° C. for two hours. The pressure in the bomb was in the range of 1000–2000 p.s.i.g. A compound was formed having the following structure:

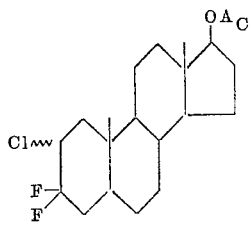

(2-chloro-3,3-difluoro-androstane-17β-ol acetate)

*Example 4*

An experiment was carried out similar to that of Example 3 except that the $SF_4$ used was that purified by the process in Example 1.

A compound was formed having the following structure:

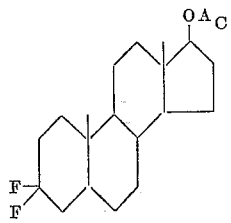

(3,3-difluoro-androstane-17β-ol acetate)

The above description and examples are intended to be illustrative only. Any modification of, or variation therefrom which conforms to the spirit of the invention, is intended to be included within the scope of the claims.

What is claimed is:

1. In the process for the production of sulfur tetrafluoride which is free of chlorinating agents, from sulfur tetrafluoride which contains chlorinating agents, the improvements of which comprise the steps of (1) adding mercury to sulfur tetrafluoride which contains chlorinating agents, (2) intimately mixing the sulfur tetrafluoride and the mercury, and (3) separating sulfur tetrafluoride free of chlorinating agents from the mercury.

2. In the process of producing sulfur tetrafluoride which is free of chlorinating agents, the improvement of which comprises the step of contacting sulfur tetrafluoride which contains chlorinating agents with mercury at a temperature in the range of from about 0° C. up to about 30° C.

3. In the process for manufacturing sulfur tetrafluoride, the improvement which comprises: (1) cooling technical sulfur tetrafluoride containing as an impurity a member selected from the group consisting of elemental chlorine and chlorine combined with sulfur, in an enclosed volume down to a temperature in the range of —100° C. up to —60° C., thereby causing the pressure of said sulfur tetrafluoride to be reduced to a pressure of less than or equal to one atmosphere, (2) introducing mercury into said enclosed volume in an amount so that the ratio of mercury to sulfur tetrafluoride within the enclosed volume is of the order 1:5 by weight, (3) raising the temperature of the contents of the enclosed volume to a temperature in the range of from about 0° C. to about 30° C. while maintaining said contents within said enclosed volume, (4) intimately mixing said mercury and said sulfur tetrafluoride within said enclosed volume and while at said raised temperature, whereupon the chlorine impurity reacts with the mercury to form mercuric chloride, which is solid at the temperatures involved and (5) separating the resulting chlorine-free sulfur tetrafluoride as a gas from the liquid mercury and the mercuric chloride contained therein.

References Cited in the file of this patent

UNITED STATES PATENTS

| | | |
|---|---|---|
| 2,859,245 | Smith | Nov. 4, 1958 |
| 2,897,055 | Mutterties et al. | July 28, 1959 |

FOREIGN PATENTS

| | | |
|---|---|---|
| 575,460 | Canada | May 5, 1959 |

OTHER REFERENCES

Brown et al.: J.C.S. (1955), 3147–3151.